(12) United States Patent
Zhang et al.

(10) Patent No.: US 10,171,855 B2
(45) Date of Patent: *Jan. 1, 2019

(54) METHOD AND APPARATUS FOR SYNCHRONIZING VIDEO LIVE BROADCAST

(71) Applicant: Huawei Technologies Co., Ltd., Shenzhen (CN)

(72) Inventors: Lixue Zhang, Shenzhen (CN); Chunshan Xiong, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/789,652

(22) Filed: Oct. 20, 2017

(65) Prior Publication Data

US 2018/0041789 A1 Feb. 8, 2018

Related U.S. Application Data

(63) Continuation of application No. 14/829,412, filed on Aug. 18, 2015, now Pat. No. 9,813,744, which is a (Continued)

(51) Int. Cl.
*H04N 7/16* (2011.01)
*H04N 21/242* (2011.01)
(Continued)

(52) U.S. Cl.
CPC ....... *H04N 21/242* (2013.01); *H04L 65/4076* (2013.01); *H04L 65/605* (2013.01);
(Continued)

(58) Field of Classification Search
CPC .............................. H04N 21/87; H04N 21/242
See application file for complete search history.

(56) References Cited

U.S. PATENT DOCUMENTS 7,934,239 B1    4/2011 Dagman
2002/0010917 A1    1/2002 Srikantan et al.
(Continued)

FOREIGN PATENT DOCUMENTS

CN    101384019 A    3/2009
CN    101877908 A    11/2010
(Continued)

OTHER PUBLICATIONS

Lohmar, T., et al., "Delivering Content with LTE Broadcast," Ericsson Review, Feb. 11, 2013, 8 pages.
(Continued)

*Primary Examiner* — Gigi L Dubasky
(74) *Attorney, Agent, or Firm* — Slater Matsil, LLP

(57) ABSTRACT

The present invention relates to a method for synchronizing video live broadcast. In the present invention, a video stream synchronization request is sent to a network side device; a video stream playback position synchronization parameter sent by the network side device is received, where the video stream playback position synchronization parameter includes a playback position parameter at a video stream sending moment and a system frame number SFN at the video stream sending moment; an SFN at a video stream receiving moment is acquired; and the playback position parameter at the video stream sending moment is adjusted according to the SFN at the video stream sending moment and the SFN at the video stream receiving moment, so as to coincide with a current playback position parameter of the network side device.

19 Claims, 8 Drawing Sheets

Related U.S. Application Data continuation of application No. PCT/CN2013/071642, filed on Feb. 18, 2013.

(51) Int. Cl.

| | | |
|---|---|---|
| *H04L 29/06* | (2006.01) | |
| *H04N 21/238* | (2011.01) | |
| *H04N 21/24* | (2011.01) | |
| *H04N 21/234* | (2011.01) | |
| *H04N 21/647* | (2011.01) | |
| *H04N 21/61* | (2011.01) | |
| *H04N 21/2187* | (2011.01) | |
| *H04N 21/2183* | (2011.01) | |
| *H04N 21/43* | (2011.01) | |
| *H04N 21/6405* | (2011.01) | |
| *H04N 21/8547* | (2011.01) | |

(52) U.S. Cl.
CPC ..... *H04N 21/2183* (2013.01); *H04N 21/2187* (2013.01); *H04N 21/23406* (2013.01); *H04N 21/23805* (2013.01); *H04N 21/2402* (2013.01); *H04N 21/4305* (2013.01); *H04N 21/6131* (2013.01); *H04N 21/6405* (2013.01); *H04N 21/64769* (2013.01); *H04N 21/8547* (2013.01)

(56) References Cited

U.S. PATENT DOCUMENTS

| | | | |
|---|---|---|---|
| 2010/0309892 A1* | 12/2010 | Torsner | H04L 1/1812 370/336 |
| 2013/0198298 A1* | 8/2013 | Li | H04N 21/41407 709/206 |

FOREIGN PATENT DOCUMENTS

| | | |
|---|---|---|
| CN | 101895750 A | 11/2010 |
| CN | 102077614 A | 5/2011 |
| CN | 102136863 A | 7/2011 |
| WO | 2012146187 A1 | 11/2012 |

OTHER PUBLICATIONS

Sharp, "SFN Synchronization without BCH Bits for LTE," 3GPP TSG-RAN WG2#57, R2-070513, St. Louis, Missouri, Feb. 12-17, 2007, 4 pages.

Wang, H., et al., "LTE MBMS SYNC Protocol for Support Synchronisation of Content," IEEE, Proceedings of ICCTA2009, pp. 392-395.

\* cited by examiner

METHOD AND APPARATUS FOR SYNCHRONIZING VIDEO LIVE BROADCAST

CROSS-REFERENCE TO RELATED APPLICATIONS

This application is a continuation of U.S. patent application Ser. No. 14/829,412, filed on Aug. 18, 2015, which is a continuation of International Application No. PCT/CN2013/71642, filed on Feb. 18, 2013. All of the afore-mentioned patent applications are hereby incorporated by reference in their entireties.

TECHNICAL FIELD

The present invention relates to the field of network technologies, and in particular, to a method and an apparatus for synchronizing video live broadcast.

BACKGROUND

At present, video live broadcast services on a network are becoming more popular. A user may watch a network live video program using a terminal such as a personal computer, a tablet computer, or a mobile phone. A network live video has a strict requirement on real-time performance, that is, a specific data unit is decoded and displayed within a specific time period, which requires a network to provide enough bandwidth and an ensured time delay and loss rate. However, due to various reasons, network video applications face different requirements of service quality, and the various reasons include: that a growing speed of network resources cannot match a growing speed of video applications, that a network service does not ensure service quality, that a network features heterogeneity, and that users have different requirements. Therefore, for a fixed network or a mobile network, a lack of an ensured time delay and synchronization seriously affects experience of a user in watching live broadcast.

When the prior art is used to perform video live broadcast, user equipment (UE) sends a streaming media request to a streaming server at a T1 moment; and the Streaming server starts to respond to the UE, and sends a first video data packet to the UE at a T2 moment, and after completing sending the first video data packet, the streaming server continues to send a second video data packet, and so on, until sending of video data packets requested by a user is completed. In this case, before playing a video, the UE needs to wait to a T3 moment when video data of enough length has been buffered in a video buffer area. Similarly, after another UE sends a streaming media request, the Streaming server sends video data packets to the UE in a same manner.

However, when different UEs request video live broadcast, transmission delays from the Streaming server to the different UEs are different, and video buffer delays required for the different UEs are different, causing that the different UEs are not synchronous when playing a same live broadcast video, thereby reducing user experience.

SUMMARY

Embodiments of the present invention provide a method and an apparatus for synchronizing video live broadcast, which can improve user experience of a video live broadcast service.

According to a first aspect, embodiments of the present invention provide a method for synchronizing video live broadcast. The method includes sending a video stream synchronization request to a network side device and receiving a video stream playback position synchronization parameter sent by the network side device. The video stream playback position synchronization parameter includes a playback position parameter at a video stream sending moment and a system frame number SFN at the video stream sending moment. The method also includes acquiring an SFN at a video stream receiving moment; and adjusting, according to the SFN at the video stream sending moment and the SFN at the video stream receiving moment, the playback position parameter at the video stream sending moment, so as to coincide with a current playback position parameter of the network side device.

In a first possible embodiment, with reference to the first aspect, the adjusting, according to the SFN at the video stream sending moment and the SFN at the video stream receiving moment, the playback position parameter at the video stream sending moment includes determining a transmission delay of the video stream according to the SFN at the video stream sending moment and the SFN at the video stream receiving moment; and adjusting, according to the transmission delay of the video stream, the playback position parameter at the video stream sending moment, so as to coincide with the current playback position parameter of the network side device.

In a second possible embodiment, with reference to the first possible embodiment in the first aspect, the determining a transmission delay of the video stream according to the SFN at the video stream sending moment and the SFN at the video stream receiving moment includes determining the transmission delay of the video stream according to the relation $TD=-(SFN2-SFN1)*10$, where TD represents the transmission delay of the video stream, SFN1 represents the SFN at the video stream sending moment, and SFN2 represents the SFN at the video stream receiving moment.

In a third possible embodiment, with reference to the first possible embodiment in the first aspect, the adjusting, according to the transmission delay of the video stream, the playback position parameter at the video stream sending moment includes determining a current playback position parameter according to $VT2=VT1+TD$, where VT2 represents the current playback position parameter, and VT1 represents the playback position parameter at the video stream sending moment.

In a fourth possible embodiment, with reference to any one of the foregoing possible embodiments, the network side device is a radio access network cache RAN Cache, or is an RAN node and a main cache Main Cache, or is an RAN node and a live streaming server. The received playback position parameter at the video stream sending moment and the received SFN at the video stream sending moment are determined and sent by the RAN Cache; or, the received playback position parameter at the video stream sending moment is determined and sent by the Main Cache or the live streaming server; and the received SFN at the video stream sending moment is determined, added to the video stream playback position synchronization parameter, and then sent by the RAN node.

In a fifth possible embodiment, with reference to the fourth possible embodiment in the first aspect, a timer is disposed in the RAN Cache or the Main Cache, and the playback position parameter is determined according to the timer.

According to a second aspect, embodiments of the present invention provide a method for synchronizing video live broadcast. The method includes including receiving, by a network side device, a video stream synchronization request sent by user equipment UE, and determining, by the network side device, a video stream playback position synchronization parameter according to the video stream synchronization request. The video stream playback position synchronization parameter includes a playback position parameter at a video stream sending moment and a system frame number SFN at the video stream sending moment. The method further includes sending, by the network side device, the video stream playback position synchronization parameter to the UE, so that the UE adjusts, according to the SFN at the video stream sending moment, the playback position parameter at the video stream sending moment to coincide with a current playback position parameter of the network side device.

In a first possible embodiment, with reference to the second aspect, the network side device is a radio access network cache RAN Cache, or is an RAN node and a main cache Main Cache, or is an RAN node and a live streaming server.

In a second possible embodiment, with reference to the first possible embodiment in the second aspect, when the network side device is the RAN Cache, the RAN Cache determines the video stream playback position synchronization parameter; and the RAN Cache sends the video stream playback position synchronization parameter to the UE.

In a third possible embodiment, with reference to the first possible embodiment in the second aspect, when the network side device is the RAN node and the Main Cache, or is the RAN node and the live streaming server, the Main Cache or the live streaming server determines the playback position parameter at the video stream sending moment in the video stream playback position synchronization parameter. The Main Cache or the live streaming server sends the video stream playback position synchronization parameter to the RAN node. The RAN node determines the SFN at the video stream sending moment, and inserts the SFN at the video stream sending moment into the video stream playback position synchronization parameter The RAN node sends the video stream playback position synchronization parameter to the UE.

In a fourth possible embodiment, with reference to the second possible embodiment in the second aspect, or with reference to the third possible embodiment in the second aspect, a timer is disposed in the RAN Cache or the Main Cache, and the playback position parameter is determined according to the timer. When receiving the video stream synchronization request sent by a first UE, the network side device initializes and starts the timer.

In a fifth possible embodiment, with reference to the fourth possible embodiment in the second aspect, the initializing the timer includes: setting a value of the timer to be a video stream playback time point that is set when the first UE is synchronized.

According to a third aspect, embodiments of the present invention provide an apparatus for synchronizing video live broadcast, including a sending unit, configured to send a video stream synchronization request to a network side device, and a receiving unit, configured to, after the sending unit sends the video stream synchronization request, receive a video stream playback position synchronization parameter sent by the network side device. The video stream playback position synchronization parameter includes a playback position parameter at a video stream sending moment and a system frame number SFN at the video stream sending moment. The apparatus also includes an acquiring unit, configured to, after the receiving unit receives the video stream playback position synchronization parameter, acquire an SFN at a video stream receiving moment, and a processing unit, configured to adjust, according to the SFN, received by the receiving unit, at the video stream sending moment and the SFN, acquired by the acquiring unit, at the video stream receiving moment, the playback position parameter at the video stream sending moment, so as to coincide with a current playback position parameter of the network side device.

In a first possible embodiment, with reference to the third aspect, the processing unit includes a transmission delay determining module, configured to determine a transmission delay of the video stream according to the SFN, received by the receiving unit, at the video stream sending moment and the SFN, acquired by the acquiring unit, at the video stream receiving moment. The processing unit also includes and a processing module, configured to adjust, according to the transmission delay, determined by the transmission delay determining module, of the video stream, the playback position parameter at the video stream sending moment, so as to coincide with the current playback position parameter of the network side device.

In a second possible embodiment, with reference to the first possible embodiment in the third aspect, the transmission delay determining module is specifically configured to determine the transmission delay of the video stream according to the relation TD=(SFN2−SFN1)*10, where TD represents the transmission delay of the video stream, SFN1 represents the SFN at the video stream sending moment, and SFN2 represents the SFN at the video stream receiving moment.

In a third possible embodiment, with reference to the first possible embodiment in the third aspect, the processing module is specifically configured to: determine a current playback position parameter according to the relation VT2=VT1+TD, where VT2 represents the current playback position parameter, and VT1 represents the playback position parameter at the video stream sending moment.

In a fourth possible embodiment, with reference to any one of the possible embodiments in the third aspect, the network side device is a radio access network cache RAN Cache, or is an RAN node and a main cache Main Cache, or is an RAN node and a live streaming server. The playback position parameter, received by the receiving unit, at the video stream sending moment and the SFN, received by the receiving unit, at the video stream sending moment are determined and sent by the RAN Cache; or, the playback position parameter, received by the receiving unit, at the video stream sending moment is determined and sent by the Main Cache or the live streaming server; and the SFN, received by the receiving unit, at the video stream sending moment is determined, added to the video stream playback position synchronization parameter, and then sent by the RAN node.

In a fifth possible embodiment, with reference to the fourth possible embodiment in the third aspect, a timer is disposed in the RAN Cache or the Main Cache, and the playback position parameter is determined according to the timer.

According to a fourth aspect, embodiments of the present invention provide an apparatus for synchronizing video live broadcast, including a transmitter, configured to send a video stream synchronization request to a network side device, and a receiver, configured to, after the transmitter sends the video stream synchronization request, receive a video stream playback position synchronization parameter sent by the network side device, where the video stream playback position synchronization parameter includes a playback position parameter at a video stream sending moment and a system frame number SFN at the video stream sending moment. The apparatues also includes a processor, configured to, after the receiver receives the video stream playback position synchronization parameter, acquire an SFN at a video stream receiving moment; and adjust, according to the SFN, received by the receiver, at the video stream sending moment and the acquired SFN at the video stream receiving moment, the playback position parameter at the video stream sending moment, so as to coincide with a current playback position parameter of the network side device.

In a first possible embodiment, with reference to the fourth aspect, the processor is configured to determine a transmission delay of the video stream according to the SFN, received by the receiver, at the video stream sending moment and the SFN, acquired by the processor, at the video stream receiving moment The processor is also configured to, after determining the transmission delay of the video stream, adjust, according to the transmission delay of the video stream, the playback position parameter at the video stream sending moment, so as to coincide with the current playback position parameter of the network side device.

In a second possible embodiment, with reference to the first possible embodiment in the fourth aspect, the processor is specifically configured to determine the transmission delay of the video stream according to the relation TD=(SFN2−SFN1)*10, where TD represents the transmission delay of the video stream, SFN1 represents the SFN at the video stream sending moment, and SFN2 represents the SFN at the video stream receiving moment.

In a third possible embodiment, with reference to the first possible embodiment in the fourth aspect, the processor is specifically configured to determine a current playback position parameter according to VT2=VT1+TD, where VT2 represents the current playback position parameter, and VT1 represents the playback position parameter at the video stream sending moment.

In a fourth possible embodiment, with reference to any one of the possible embodiments in the fourth aspect, the network side device is a radio access network cache RAN Cache, or is an RAN node and a main cache Main Cache, or is an RAN node and a live streaming server. The playback position parameter, received by the receiver, at the video stream sending moment and the SFN, received by the receiver, at the video stream sending moment are determined and sent by the RAN Cache; or, the playback position parameter, received by the receiver, at the video stream sending moment is determined and sent by the Main Cache or the live streaming server; and the SFN, received by the receiver, at the video stream sending moment is determined, added to the video stream playback position synchronization parameter, and then sent by the RAN node.

In a fifth possible embodiment, with reference to the fourth possible embodiment in the fourth aspect, a timer is disposed in the RAN Cache or the Main Cache, and the playback position parameter is determined according to the timer.

According to a fifth aspect, embodiments of the present invention provide an apparatus for synchronizing video live broadcast, including a receiving unit, configured to receive a video stream synchronization request sent by user equipment UE and a determining unit, configured to: after the receiving unit receives the video stream synchronization request, determine a video stream playback position synchronization parameter according to the video stream synchronization request. The video stream playback position synchronization parameter includes a playback position parameter at a video stream sending moment and a system frame number SFN at the video stream sending moment. The apparatus also includes a sending unit, configured to, after the determining unit determines the video stream playback position synchronization parameter, send the video stream playback position synchronization parameter to the UE, so that the UE adjusts, according to the SFN at the video stream sending moment, the playback position parameter at the video stream sending moment to coincide with a current playback position parameter of the apparatus for synchronizing video live broadcast.

In a first possible embodiment, with reference to the fifth aspect, the apparatus for synchronizing video live broadcast is a radio access network cache RAN Cache, or is an RAN node and a main cache Main Cache, or is an RAN node and a live streaming server.

In a second possible embodiment, with reference to the first possible embodiment in the fifth aspect, when the apparatus for synchronizing video live broadcast is the RAN Cache, the determining unit in the RAN Cache determines the video stream playback position synchronization parameter; and the sending unit in the RAN Cache sends the video stream playback position synchronization parameter to the UE.

In a third possible embodiment, with reference to the second possible embodiment in the fifth aspect, when the apparatus for synchronizing video live broadcast is the RAN Cache, the RAN Cache further includes a timer, configured to determine the playback position parameter; and an initialization unit, configured to, when the video stream synchronization request sent by first UE is received, initialize and start the timer.

In a fourth possible embodiment, with reference to the third possible embodiment in the fifth aspect, when the apparatus for synchronizing video live broadcast is the RAN node and the Main Cache, or is the RAN node and the live streaming server, the determining unit in the Main Cache or the live streaming server determines the playback position parameter at the video stream sending moment in the video stream playback position synchronization parameter; the sending unit in the Main Cache or the live streaming server sends the video stream playback position synchronization parameter to the RAN node; the determining unit in the RAN node determines the SFN at the video stream sending moment, and inserts the SFN at the video stream sending moment into the video stream playback position synchronization parameter; and the sending unit in the RAN node sends the video stream playback position synchronization parameter to the UE.

In the fourth possible embodiment, with reference to the third possible embodiment in the fifth aspect, when the apparatus for synchronizing video live broadcast is the RAN node and the Main Cache, or is the RAN node and the live streaming server, the Main Cache or the live streaming server further includes a timer, configured to determine the playback position parameter; and an initialization unit, configured to: when the video stream synchronization request sent by first UE is received, initialize and start the timer.

In a fifth possible embodiment, with reference to the second possible embodiment in the fifth aspect, or with reference to the fourth possible embodiment in the fifth aspect, the initialization unit in the RAN Cache, and the initialization unit in the Main Cache or the live streaming server are specifically configured to set a value of the timer to be a video stream playback time point that is set when the first UE is synchronized.

According to a sixth aspect, embodiments of the present invention provide an apparatus for synchronizing video live broadcast. The apparatus includes a receiver, configured to receive a video stream synchronization request sent by user equipment UE. The apparatus also includes a processor, configured to, after the receiver receives the video stream synchronization request, determine a video stream playback position synchronization parameter according to the video stream synchronization request, where the video stream playback position synchronization parameter includes a playback position parameter at a video stream sending moment and a system frame number SFN at the video stream sending moment. The apparatus also includes a transmitter, configured to: after the processor determines the video stream playback position synchronization parameter, send the video stream playback position synchronization parameter to the UE, so that the UE adjusts, according to the SFN at the video stream sending moment, the playback position parameter at the video stream sending moment to coincide with a current playback position parameter of the apparatus for synchronizing video live broadcast.

In a first possible embodiment, with reference to the sixth aspect, the apparatus for synchronizing video live broadcast is a radio access network cache RAN Cache, or is an RAN node and a main cache Main Cache, or is an RAN node and a live streaming server.

In a second possible embodiment, with reference to the first possible embodiment in the sixth aspect, when the apparatus for synchronizing video live broadcast is the RAN Cache, the processor in the RAN Cache determines the video stream playback position synchronization parameter; and the transmitter in the RAN Cache sends the video stream playback position synchronization parameter to the UE.

In a third possible embodiment, with reference to the second possible embodiment in the sixth aspect, when the apparatus for synchronizing video live broadcast is the RAN Cache, the RAN Cache further includes a timer, configured to determine the playback position parameter; and the processor is further configured to: when the video stream synchronization request sent by first UE is received, initialize and start the timer.

In a fourth possible embodiment, with reference to the second possible embodiment in the sixth aspect, when the apparatus for synchronizing video live broadcast is the RAN node and the Main Cache, or is the RAN node and the live streaming server, the processor in the Main Cache or the live streaming server determines the playback position parameter at the video stream sending moment in the video stream playback position synchronization parameter; the transmitter in the Main Cache or the live streaming server sends the video stream playback position synchronization parameter to the RAN node; the processor in the RAN node determines the SFN at the video stream sending moment, and inserts the SFN at the video stream sending moment into the video stream playback position synchronization parameter; and the transmitter in the RAN node sends the video stream playback position synchronization parameter to the UE.

In a fifth possible embodiment, with reference to the fourth possible embodiment in the sixth aspect, when the apparatus for synchronizing video live broadcast is the RAN node and the Main Cache, or is the RAN node and the live streaming server, the Main Cache or the live streaming server further includes a timer, configured to determine the playback position parameter; and the processor is further configured to, when the video stream synchronization request sent by first UE is received, initialize and start the timer.

In a sixth possible embodiment, with reference to the fifth possible embodiment in the sixth aspect, or with reference to the third possible embodiment in the sixth aspect, the processor in the RAN Cache, and the processor in the Main Cache or the live streaming server are specifically configured to set a value of the timer to be a video stream playback time point that is set when the first UE is synchronized.

The embodiments of the present invention provide a method and an apparatus for synchronizing video live broadcast, where a video stream synchronization request is sent to a network side device. A video stream playback position synchronization parameter sent by the network side device is received, where the video stream playback position synchronization parameter includes a playback position parameter at a video stream sending moment and a system frame number SFN at the video stream sending moment. An SFN at a video stream receiving moment is acquired, and the playback position parameter at the video stream sending moment is adjusted according to the SFN at the video stream sending moment and the SFN at the video stream receiving moment, so as to coincide with a current playback position parameter of the network side device. Compared with that when the prior art is used to perform video live broadcast, transmission delays for different UEs from a Streaming server are different, and the different UEs need different video buffer delays, causing that the different UEs are not synchronous when playing a same live broadcast video, and thereby reducing user experience, in the method provided in the embodiments of the present invention, the playback position parameter at the video stream sending moment is adjusted according to the SFN at the video stream sending moment and the SFN at the video stream receiving moment, so as to coincide with a current playback position parameter of the network side device, so that user experience of a video live broadcast service is improved.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figures 1, 2:
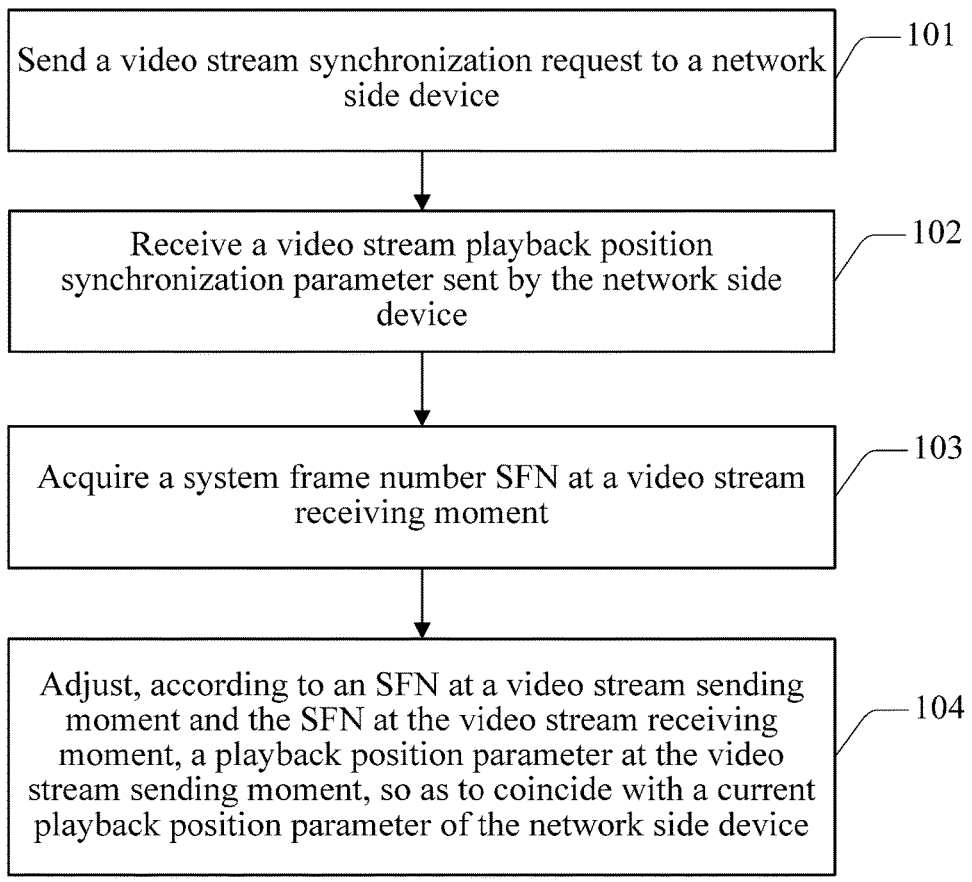
FIG. 1 is a flowchart of a method (on a UE side) for synchronizing video live broadcast according to an embodiment of the present invention.
FIG. 2 is a schematic diagram of a system frame according to an embodiment of the present invention.

An embodiment of the present invention provides a method for synchronizing video live broadcast. The method may be performed by UE. The UE may be a device such as a personal computer, a mobile phone, or a tablet computer. As shown in FIG. 1, the method includes the following steps.

Step 101: Send a video stream synchronization request to a network side device.

The video stream synchronization request is used for requesting to acquire a live video of the network side device, to be played synchronously with the live video of the network side device. In this step, the video stream synchronization request further includes a request for acquiring a video stream, and a name of the video stream.

Because a stream technology is used, a user can watch in real time the live video of the network side device, that is, the UE can synchronously play the live video of the network side device. The stream technology is a network transmission technology that uploads information about continuous images and information about continuous sounds to a website server after compressing the information, so that the user can watch or listen to the information while downloading the information. The video in this step is streaming media, which is a multimedia file that is transmitted on a network by using the stream technology.

Step 102: Receive a video stream playback position synchronization parameter sent by the network side device, where the video stream playback position synchronization parameter includes a playback position parameter at a video stream sending moment and a system frame number (SFN) at the video stream sending moment.

Optionally, the playback position parameter may be determined according to a timer, to indicate a playback position of a current video, in a unit of second or millisecond. For example, the playback position parameter may be the 5th second, which indicates that the current video is played to an image of the 5th second.

Optionally, the timer is started when the playback position parameter is delivered for the first time. An initial value of the timer is a video playback time point when the first UE requests for video stream synchronization.

An SFN refers to an SFN at a current radio access network (RAN) node. The current RAN node refers to an RAN node corresponding to a base station that receives a video stream synchronization request, or an RAN node corresponding to a base station that receives a video stream playback position synchronization parameter sent by a Main Cache or a live streaming server. The SFN at the video stream sending moment represents a system frame number of the current RAN node.

As shown in FIG. 2, in this embodiment, a system frame of a Long Term Evolution (LTE) network is numbered by using 10 bits, and 1024 is used as a period, that is, a number range is 0 to 1023. A length of each system frame is 10 ms. The UE receives or sends data on an LTE network by using the system frame as a carrier.

Step 103: Acquire an SFN at a video stream receiving moment.

The SFN at the video stream receiving moment is an SFN at a current moment when the video stream playback position synchronization parameter sent by the network side device is received. An objective of acquiring the SFN at the video stream receiving moment is to adjust, according to the SFN at the video stream sending moment and the SFN at the video stream receiving moment, the playback position parameter at the video stream sending moment.

Step 104: Adjust, according to the SFN at the video stream sending moment and the SFN at the video stream receiving moment, the playback position parameter at the video stream sending moment, so as to coincide with a current playback position parameter of the network side device.

For example, the SFN at the video stream sending moment is 30, the SFN at the video stream receiving moment is 150, and then a transmission delay is (150−30)×1 milliseconds, that is, 1.2 second.

The playback position parameter at the video stream sending moment is adjusted according to the transmission delay of the video stream, so as to coincide with the current playback position parameter on the network side. For example, the playback position parameter at the video stream sending moment is the 5th second, and then the playback position is adjusted to the (1.2+5)th second, that is, the 6.2th second.

It should be noted that an initial buffer delay of a video in this embodiment is implemented based on the UE, and if playback on the UE has been synchronized with playback on the network, the initial buffer delay does not affect synchronized playback on the UE. When another UE sends a video stream synchronization request to the network side, a playback position parameter at a video stream sending moment may also be adjusted according to the video stream playback position synchronization parameter sent by the network side, so as to coincide with the current playback position parameter on the network side, so that all UEs can accurately obtain the playback position parameter on the network side through synchronization, thereby acquiring a synchronized video.

This embodiment of the present invention provides a method for synchronizing video live broadcast, where a video stream playback position synchronization parameter sent by a network side is received, where the video stream playback position synchronization parameter includes a playback position parameter at a video stream sending moment and a system frame number SFN at the video stream sending moment; and the playback position parameter at the video stream sending moment is adjusted according to the SFN at the video stream sending moment, so as to coincide with a current playback position parameter on the network side, so that the solutions provided in this embodiment of the present invention can achieve synchronization of different UEs when users watch a same live broadcast video, thereby improving user experience of a video live broadcast service.

An embodiment of the present invention provides another method for synchronizing video live broadcast, and the method is performed by a network side device. The network side device may be an RAN Cache, or may be an RAN node and a Main Cache, or may be an RAN node and a live streaming server.

Figure 3:
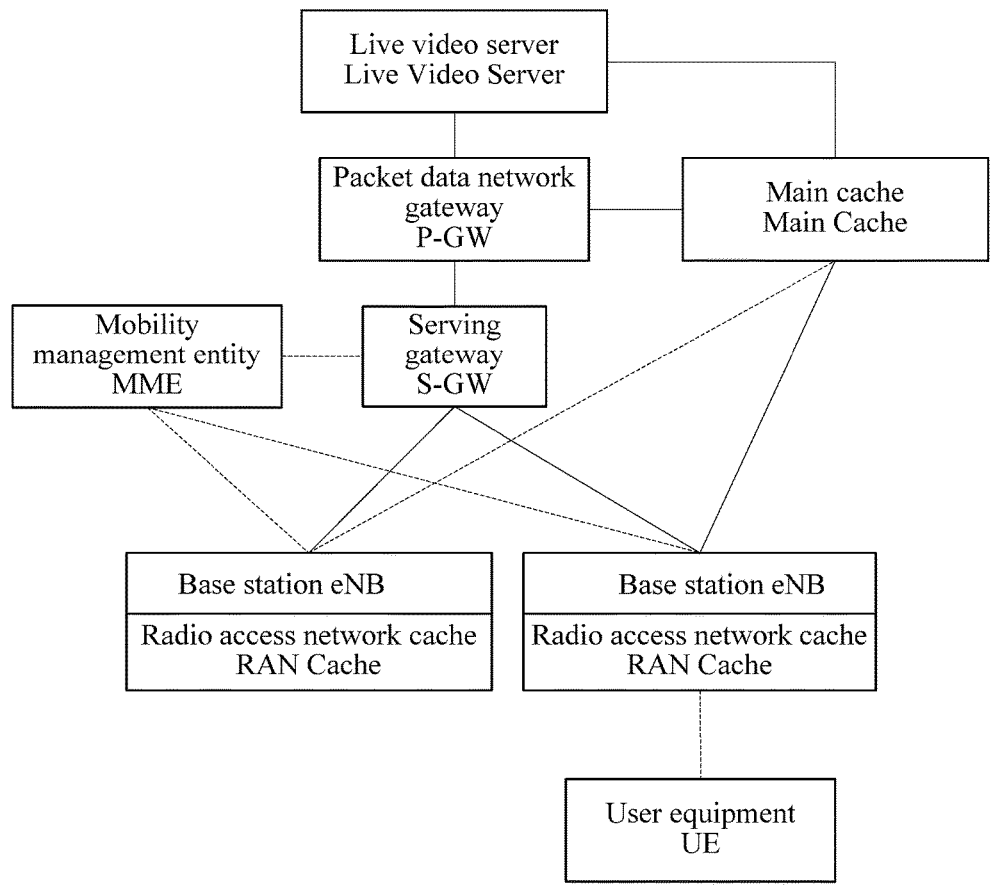
FIG. 3 is a flowchart of a method (on a network side) for synchronizing video live broadcast according to another embodiment of the present invention.

As shown in FIG. 3, a 3GPP network architecture diagram includes devices such as UE, a base station (RAN node), a serving gateway (S-GW), a packet data network gateway (P-GW), a mobility management entity (MME), a Main Cache, and a live streaming server.

When the network side device is an RAN Cache, it should be noted that a Cache functional unit is placed on an RAN node, and therefore the UE can acquire a video stream from the RAN Cache or request video stream synchronization.

When the network side device is an RAN node and a Main Cache, or is an RAN node and a live streaming server, a Cache functional unit is placed in a core network, and may be disposed together with a gateway, for example, placed on a functional unit such as a general packet radio service gateway support node (GGSN), a servicing GPRS support node (SGSN), a P-GW, or an S-GW, or may also be an independent functional unit, collectively referred to as the Main Cache. In this case, the Cache functional unit may be or may not be disposed on the RAN node. The RAN node may be a network element such as an evolved base station eNode B, a base station Node B, or a radio network controller (RNC).

Figure 4:
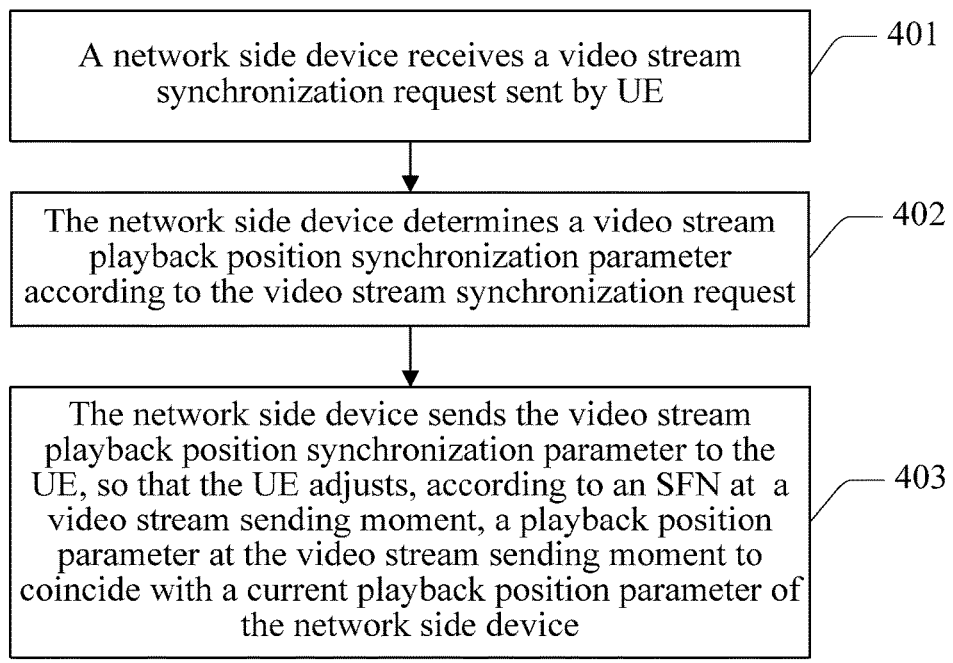
FIG. 4 is a flowchart of another method for synchronizing video live broadcast according to another embodiment of the present invention.

As shown in FIG. 4, the method includes the following steps.

Step 401: A network side device receives a video stream synchronization request sent by UE.

The video stream synchronization request is used for requesting to acquire a live video of the network side device, to be played synchronously with the live video of the network side device. In this step, the video stream synchronization request further includes a request for acquiring a video stream, and a name of the video stream.

Step 402: The network side device determines a video stream playback position synchronization parameter according to the video stream synchronization request, where the video stream playback position synchronization parameter includes a playback position parameter at a video stream sending moment and a system frame number SFN at the video stream sending moment.

Optionally, after receiving the video stream synchronization request, the network side device determines a corresponding video stream according to the name of the video stream in the video stream synchronization request, and then acquires a playback position parameter at a current video stream and an SFN at a currently-used system frame, that is, the playback position parameter at the video stream sending moment and the SFN at the video stream sending moment in this embodiment.

As shown in FIG. 2, in this embodiment, a system frame of a Long Term Evolution LTE network is numbered by 10 bits, and 1024 is used as a period, that is, a number range is 0 to 1023. A length of each system frame is 10 ms. The UE receives or sends data on an LTE network by using the system frame as a carrier.

Optionally, the playback position parameter may be determined according to a timer that is disposed in an RAN Cache or a Main Cache, to indicate a playback position of a current video, in a unit of the second or millisecond. For example, the playback position parameter may be the 5th second, which indicates that the current video is played to an image of the 5th second.

It should be noted that the timer is started when the playback position parameter is delivered for the first time. An initial value of the timer is a video playback time point when the first UE requests for video stream synchronization. When another user sends a video stream synchronization request to the network side device again, the network side device updates a current playback position parameter and SFN, and generates a playback position synchronization parameter according to the updated playback position parameter and SFN.

Step 403: The network side device sends the video stream playback position synchronization parameter to the UE, so that the UE adjusts, according to the SFN at the video stream sending moment, the playback position parameter at the video stream sending moment to coincide with a current playback position parameter of the network side device.

This embodiment of the present invention provides a method for synchronizing video live broadcast, where a video stream playback position synchronization parameter is determined according to a video stream synchronization request sent by UE, where the video stream playback position synchronization parameter includes a playback position parameter at a video stream sending moment and a system frame number SFN at the video stream sending moment; and then a network side sends the video stream playback position synchronization parameter to the UE, so that the UE adjusts, according to the SFN at the video stream sending moment, the playback position parameter at the video stream sending moment, so that the solutions provided in this embodiment of the present invention can achieve synchronization of different UEs when users watch a same live broadcast video, thereby improving user experience of a video live broadcast service.

An embodiment of the present invention provides a method for synchronizing video live broadcast. In the method, a network side device is an RAN Cache. It should be noted that, as shown in FIG. 3, a Cache functional unit is placed on an RAN node, and therefore UE can acquire a video stream from the RAN Cache or request video stream synchronization.

Figure 5:
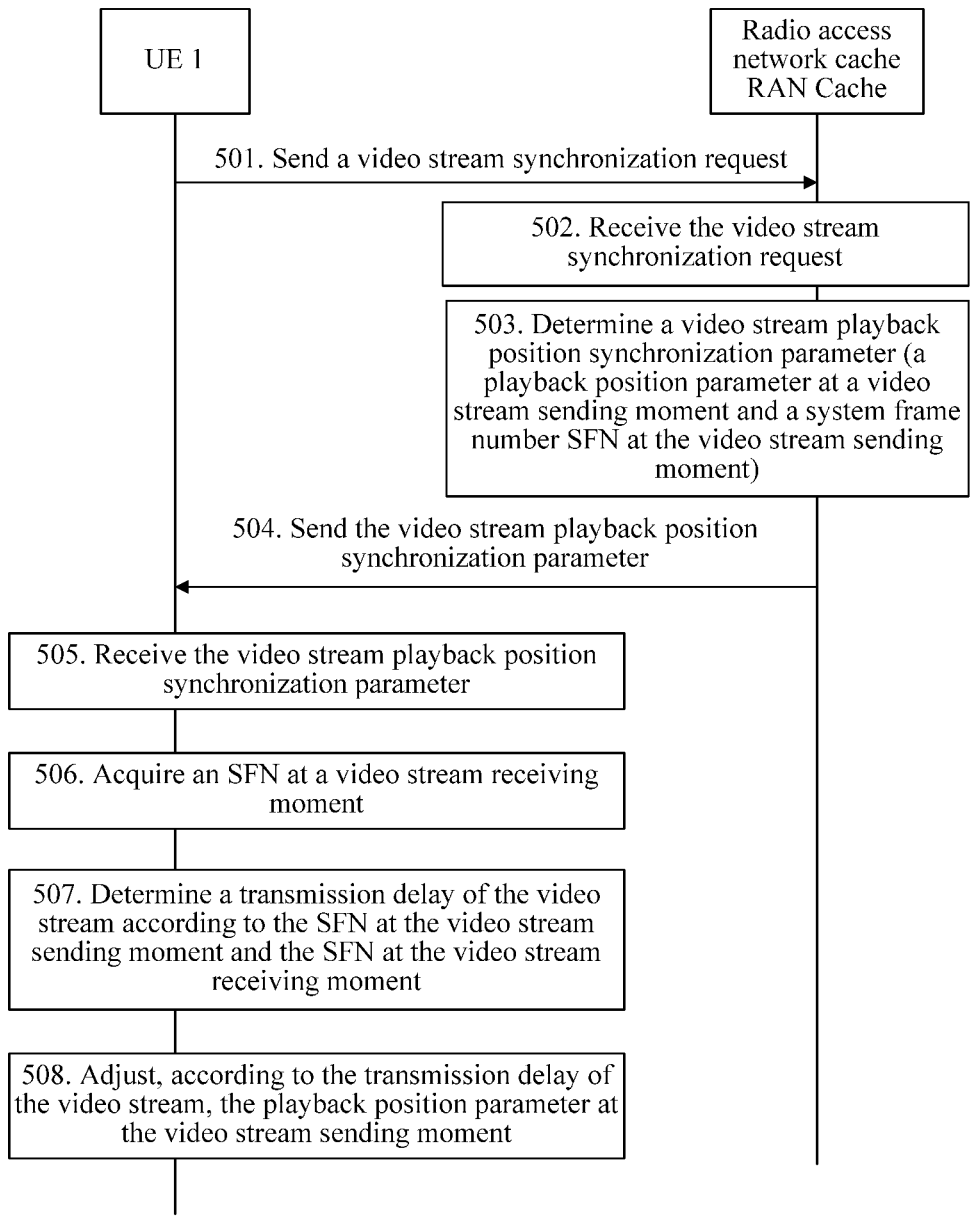
FIG. 5 is a flowchart of another method for synchronizing video live broadcast according to another embodiment of the present invention.

As shown in FIG. 5, the method includes the following steps.

Step 501: UE 1 sends a video stream synchronization request to an RAN Cache.

The UE 1 may be any user equipment that wants to acquire video live broadcast synchronized with video live broadcast on a network side device. When the UE 1 wants to obtain video live broadcast, the UE 1 may send the video stream synchronization request to the RAN Cache. The video stream synchronization request further includes a request for acquiring a video stream, and a name of the video stream.

Step 502: The RAN Cache receives the video stream synchronization request sent by the UE 1.

Step 503: The RAN Cache determines a video stream playback position synchronization parameter according to the video stream synchronization request.

The video stream playback position synchronization parameter includes a playback position parameter at a video stream sending moment and an SFN at the video stream sending moment.

The playback position parameter may be determined according to a timer that is disposed in the RAN Cache, to indicate a playback position of a current video, and the playback position parameter may be in a unit of second or millisecond. For example, the playback position parameter may be the 5th second, which indicates that the current video is played to an image of the 5th second.

It should be noted that the timer is started when the playback position parameter is delivered for the first time. An initial value of the timer is a video playback time point when the first UE requests for video stream synchronization. When another user sends a video stream synchronization request to the RAN Cache, the RAN Cache updates a current playback position parameter and an SFN, and generates a playback position synchronization parameter according to the updated playback position parameter and SFN.

An SFN refers to an SFN at a current radio access network RAN node. The current RAN node refers to an RAN node corresponding to a base station that receives a video stream synchronization request. The SFN at the video stream sending moment represents an SFN at the current RAN node.

As shown in FIG. 2, in this embodiment, a system frame of a Long Term Evolution LTE network is numbered by 10 bits, and 1024 is used as a period, that is, a number range is 0 to 1023. A length of each system frame is 10 ms. UE receives or sends data on an LTE network by using the system frame as a carrier.

Step 504: The RAN Cache sends the video stream playback position synchronization parameter to the UE 1.

Step 505: The UE 1 receives the video stream playback position synchronization parameter sent by the RAN Cache.

The video stream playback position synchronization parameter includes a playback position parameter at a video stream sending moment and an SFN at the video stream sending moment.

Step 506: The UE 1 acquires an SFN at a video stream receiving moment.

The UE 1 acquires an SFN at a current moment for receiving the video stream according to a video stream receiving moment playback position synchronization parameter. The SFN at the video stream receiving moment is acquired, so that a transmission delay of the video stream is determined according to the SFN at the video stream sending moment.

Step 507: Determine a transmission delay of the video stream according to the SFN at the video stream sending moment and the SFN at the video stream receiving moment.

Optionally, when the RAN Cache delivers the playback position parameter, the SFN at the video stream sending moment is indicated, and the SFN at the video stream sending moment indicates a system time of the video stream sending moment, and the precision may be 10 milliseconds. After receiving the playback position parameter, the UE 1 determines the SFN at the video stream receiving moment, and then the UE 1 can obtain a video stream delivered by the RAN Cache, and an elapsed time for the UE 1 to receive the video stream, that is, the transmission delay of the video stream.

Optionally, the transmission delay of the video stream is determined according to the relation TD=(SFN2−SFN1)*10, where TD represents the transmission delay of the video stream, SFN1 represents the SFN at the video stream sending moment, and SFN2 represents the SFN at the video stream receiving moment.

For example, the SFN at the video stream sending moment is 30, the SFN at the video stream receiving moment is 150, and then the transmission delay is (150−30)×10 milliseconds, that is, 1.2 second.

Step 508: Adjust, according to the transmission delay of the video stream, the playback position parameter at the video stream sending moment, so as to coincide with a current playback position parameter of the RAN Cache.

Optionally, a video on an RAN Cache side is always in a playback state, and therefore the UE 1 may adjust, according to the transmission delay of the video stream, the playback position parameter at the video stream sending moment, so as to achieve synchronization with video live broadcast on the RAN Cache side.

Optionally, a current playback position parameter is determined according to the relation VT2=VT1+TD, where VT2 represents the current playback position parameter, and VT1 represents the playback position parameter at the video stream sending moment.

For example, the playback position parameter at the video stream sending moment is the 5th second, and then the playback position is adjusted to the (1.2+5)th second, that is, the 6.2th second, thereby achieving synchronization with video live broadcast of the RAN Cache side. It should be noted that an initial buffer delay of a video in this embodiment is implemented based on UE, and if playback on the UE has been synchronized with playback on the network, the initial buffer delay does not affect synchronized playback on the UE.

It should be noted that, after this step, another UE may also access a radio access network and send a video stream synchronization request. For example, after accessing a radio access network, UE 2 sends a video stream synchronization request to the RAN Cache. After receiving the video stream synchronization request sent by the UE 2, the RAN Cache updates a video playback position parameter to a current moment of video live broadcast, determines an SFN, and generates a video stream playback position synchronization parameter according to the current moment of video live broadcast and SFN. The video stream playback position synchronization parameter includes a playback position parameter at a video stream sending moment and an SFN at the video stream sending moment. The playback position parameter at the video stream sending moment is the current moment of video live broadcast, and the SFN at the video stream sending moment is an SFN at a current sending moment. The RAN Cache sends the video stream playback position synchronization parameter to the UE 2. The UE 2 calculates, according to the SFN at the video stream sending moment in the received video stream playback position synchronization parameter and an acquired SFN of a video stream receiving moment, to obtain a transmission delay of the video stream; and adjusts, according to the transmission delay of the video stream, the playback position parameter at the video stream sending moment, so as to coincide with a current playback position parameter on the network side. In this way, the UE 2 and the UE 1 are separately synchronous with the video live broadcast of the RAN Cache, and then the UE 2 and the UE 1 may perform synchronized broadcast.

This embodiment of the present invention provides a method for synchronizing video live broadcast, where a transmission delay of a video stream is determined according to a system frame number SFN at a video stream sending moment, and a playback position parameter at the video stream sending moment is adjusted according to the transmission delay of the video stream, so as to coincide with a current playback position parameter on the network side, so that the solutions provided in this embodiment of the present invention can achieve synchronization of different UEs when users watch a same live broadcast video, thereby improving user experience of a video live broadcast service.

An embodiment of the present invention provides another method for synchronizing video live broadcast. In the method, a network side device is an RAN node and a Main Cache, or an RAN node and a Live Streaming server. Processing methods for performing video live broadcast synchronization when the network side device is an RAN node and a Main Cache and when the network side device is an RAN node and a Live Streaming server are the same. Therefore, in this embodiment, an example in which the network side device is an RAN node and a Main Cache is described in detail, and when the network side device is an RAN node and a Live Streaming server, reference may be made to the processing method for performing video live broadcast synchronization in this embodiment for execution.

It should be noted that, as shown in FIG. 3, a Cache functional unit is placed in a core network, and may be disposed together with a gateway, for example, placed on a functional unit such as a general packet radio service gateway support node GGSN, a servicing GPRS support node SGSN, a packet data network gateway P-GW, or a serving gateway S-GW, or may also be an independent functional unit, collectively referred to as the Main Cache. In this case, the Cache functional unit may be or may not be disposed on the RAN node. The RAN node may be a network element such as an evolved base station eNode B, a base station Node B, or a radio network controller RNC.

Figure 6:
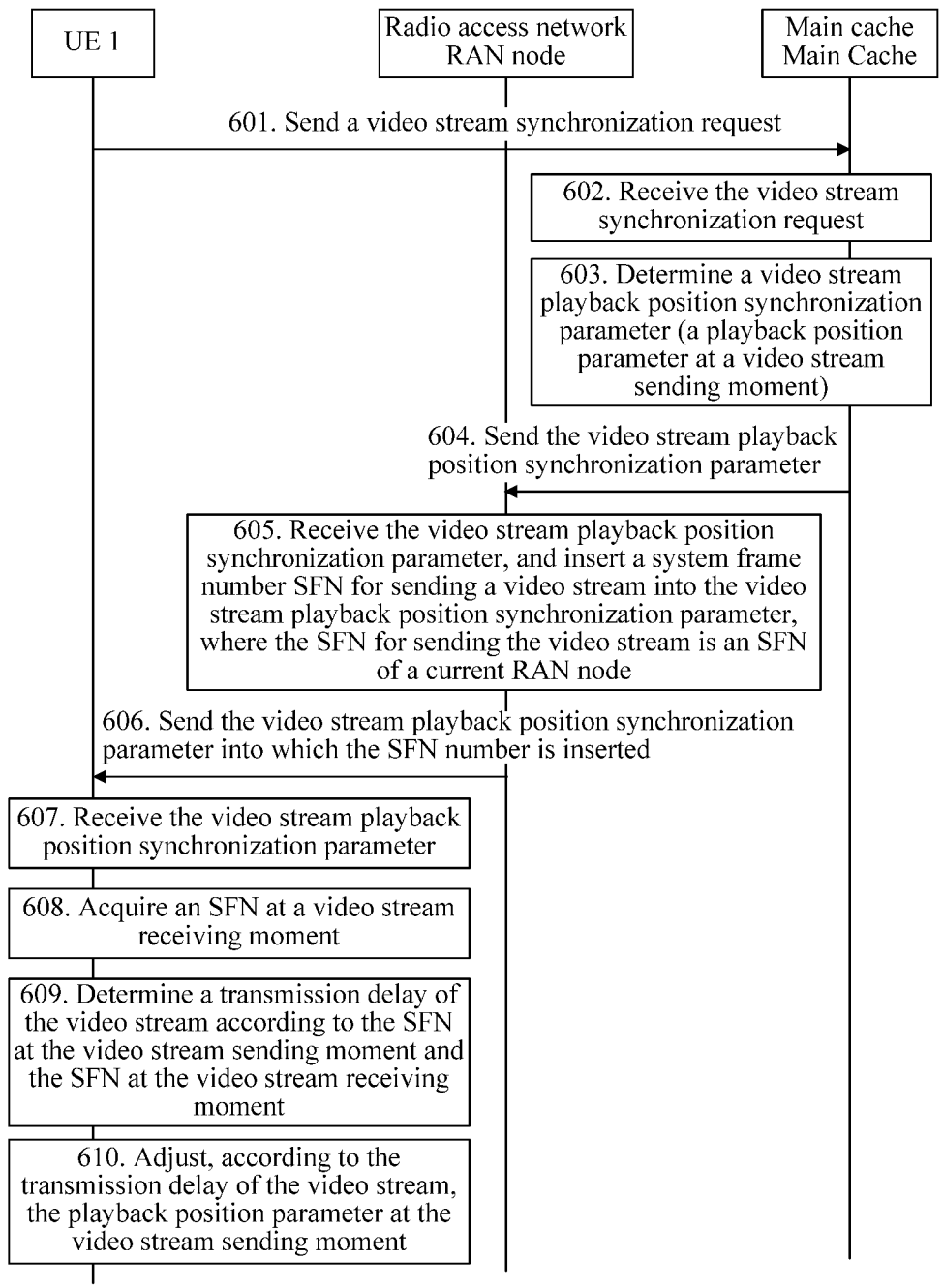
FIG. 6 is a flowchart of another method for synchronizing video live broadcast according to another embodiment of the present invention.

As shown in FIG. 6, the method includes the following steps.

Step 601: UE 1 sends a video stream synchronization request to a Main Cache.

The UE 1 may be any user equipment that wants to acquire video live broadcast synchronized with video live broadcast on a network side device. When the UE 1 wants to obtain video live broadcast, the UE 1 may send the video stream synchronization request to the Main Cache. The video stream synchronization request further includes a request for acquiring a video stream, and a name of the video stream.

Step 602: The Main Cache receives the video stream synchronization request sent by the UE 1.

Step 603: The Main Cache determines a video stream playback position synchronization parameter according to the video stream synchronization request.

A difference between this step and step 403 in FIG. 4 lies in that: in this step, the video stream playback position synchronization parameter determined by the Main Cache includes only a playback position parameter at a video stream sending moment, and does not include an SFN at the video stream sending moment.

The playback position parameter may be determined according to a timer that is disposed in the Main Cache, to indicate a playback position of a current video, and the playback position parameter may be in a unit of second or millisecond. For example, the playback position parameter may be the 5th second, which indicates that the current video is played to an image of the 5th second.

It should be noted that the timer is started when the playback position parameter is delivered for the first time. An initial value of the timer is a video playback time point when the first UE requests for video stream synchronization.

Step 604: The Main Cache sends the video stream playback position synchronization parameter to an RAN node.

The Main Cache sends the video stream playback position synchronization parameter to the RAN node, in order to enable the RAN node to determine the SFN at the video stream sending moment and to insert the SFN at the video stream sending moment into the video stream playback position synchronization parameter, so that the UE 1 estimates a transmission delay of the data stream.

It should be noted that a wired transmission delay from the Main Cache to the RAN node is small, about an error of 2 milliseconds to 10 milliseconds, and therefore can be ignored.

Step 605: The RAN node receives the video stream playback position synchronization parameter, and inserts the SFN for sending the video stream into the video stream playback position synchronization parameter, where the SFN for sending the video stream is an SFN at the current RAN node.

After receiving the video stream playback position synchronization parameter, the RAN node determines the SFN at the current RAN node according to a video stream receiving moment playback position synchronization parameter, uses the SFN at the current RAN node as the SFN at the video stream sending moment, and inserts the SFN at the current RAN node into the video stream playback position synchronization parameter.

Step 606: The RAN node sends, to the UE 1, the video stream playback position synchronization parameter into which the SFN at the video stream sending moment is inserted.

Step 607: The UE 1 receives the video stream playback position synchronization parameter sent by the RAN node.

The video stream playback position synchronization parameter includes the playback position parameter at the video stream sending moment and an SFN at the video stream sending moment.

Step 608: The UE 1 acquires an SFN at a video stream receiving moment.

The UE 1 acquires an SFN at a current moment for receiving the video stream according to a video stream receiving moment playback position synchronization parameter. The SFN at the video stream receiving moment is acquired, so that a transmission delay of the video stream is determined according to the SFN at the video stream sending moment.

Step 609: Determine a transmission delay of the video stream according to the SFN at the video stream sending moment and the SFN at the video stream receiving moment.

Step 610: Adjust, according to the transmission delay of the video stream, the playback position parameter at the video stream sending moment, so as to coincide with a current playback position parameter of the Main Cache.

It should be noted that, step 609 and step 610 are the same as step 507 and step 508 in FIG. 5. Specifically, reference may be made to descriptions of step 507 and step 508 in FIG. 5, and no further details are provided herein again.

It should be noted that, after this step, another UE may also access a radio access network and send a video stream synchronization request. For example, after accessing a radio access network, UE 2 sends a video stream synchronization request to the Main Cache. After receiving the video stream synchronization request sent by the UE 2, the Main Cache updates a video playback position parameter to a current moment of video live broadcast, and generates a video stream playback position synchronization parameter according to the current moment of video live broadcast. The video stream playback position synchronization parameter includes a playback position parameter at a video stream sending moment, and the playback position parameter at the video stream sending moment is the current moment of video live broadcast. The Main Cache sends the video stream playback position synchronization parameter to the RAN node. The RAN node determines an SFN at the current RAN node according to the received video stream playback position synchronization parameter, uses the SFN at the current RAN node as the SFN at the video stream sending moment, inserts the SFN at the current RAN node into the video stream playback position synchronization parameter, and sends the video stream playback position synchronization parameter to the UE 2. The UE 2 calculates, according to the SFN at the video stream sending moment in the received video stream playback position synchronization parameter and an acquired SFN of a video stream receiving moment, to obtain a transmission delay of the video stream; and adjusts, according to the transmission delay of the video stream, the playback position parameter at the video stream sending moment, so as to coincide with a current playback position parameter on the network side. In this way, the UE 2 and the UE 1 are separately synchronous with the video live broadcast of the Main Cache, and then the UE 2 and the UE 1 may perform synchronized broadcast.

This embodiment of the present invention provides a method for synchronizing video live broadcast, where a transmission delay of a video stream is determined according to a system frame number SFN at a video stream sending moment, and a playback position parameter at the video stream sending moment is adjusted according to the transmission delay of the video stream, so as to coincide with a current playback position parameter on the network side, so that the solutions provided in this embodiment of the present invention can achieve synchronization of different UEs when users watch a same live broadcast video, which solves a problem that multiple users of a video live broadcast service of a wireless network cannot synchronously watch the video, thereby improving user experience of the video live broadcast service.

Figure 7:
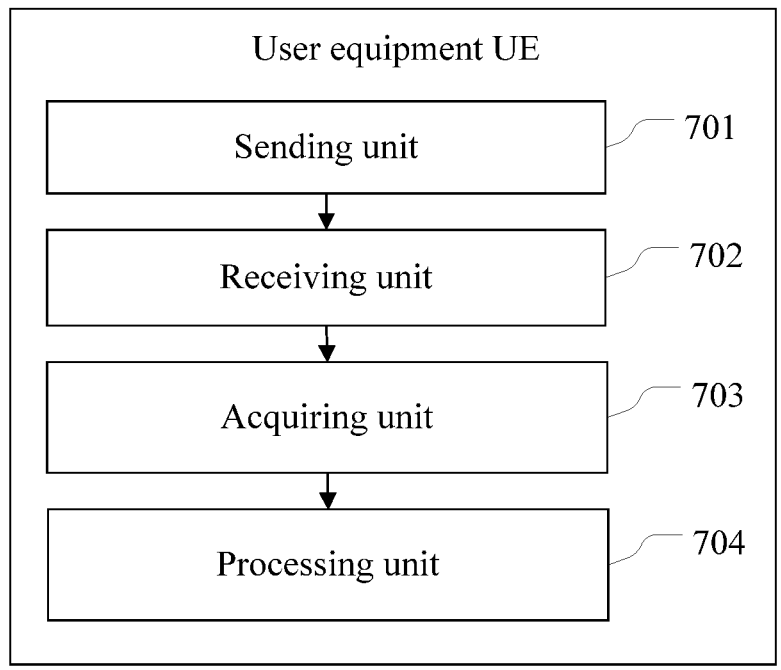
FIG. 7 is a block diagram of an apparatus (UE) for synchronizing video live broadcast according to another embodiment of the present invention.

An embodiment of the present invention provides an apparatus for synchronizing video live broadcast. The apparatus may be UE. As shown in FIG. 7, the apparatus includes: a sending unit 701, a receiving unit 702, an acquiring unit 703, and a processing unit 704.

The sending unit 701 is configured to send a video stream synchronization request to a network side device.

Optionally, the network side device may be an RAN Cache, or an RAN node and a Main Cache, or an RAN node and a live streaming server.

When the network side device is the RAN Cache, it should be noted that a Cache functional unit is placed on an RAN node, and therefore the UE can acquire a video stream from the RAN Cache or request video stream synchronization.

When the network side device is the RAN node and the Main Cache, or the RAN node and the live streaming server, it should be noted that, a Cache functional unit is placed in a core network, and may be disposed together with a gateway, for example, placed on a functional unit such as a general packet radio service gateway support node GGSN, a servicing GPRS support node SGSN, a packet data network gateway P-GW, or a serving gateway S-GW, or may also be an independent functional unit, collectively referred to as the Main Cache. In this case, the Cache functional unit may be or may not be disposed on the RAN node. The RAN node may be a network element such as an evolved base station eNode B, a base station Node B, or a radio network controller RNC.

Optionally, the sending unit 701 is configured to send the video stream synchronization request to the RAN Cache, or send the video stream synchronization request to the Main Cache or the live streaming server.

The receiving unit 702 is configured to: after the sending unit sends the video stream synchronization request, receive a video stream playback position synchronization parameter sent by the network side device, where the video stream playback position synchronization parameter includes a playback position parameter at a video stream sending moment and a system frame number SFN at the video stream sending moment.

The playback position parameter is determined according to a timer that is disposed in the RAN Cache or the Main Cache.

Optionally, the playback position parameter, received by the receiving unit 702, at the video stream sending moment and the SFN, received by the receiving unit 702, at the video stream sending moment are determined and sent by the RAN Cache; or, The playback position parameter, received by the receiving unit 702, at the video stream sending moment is determined and sent by the Main Cache or the live streaming server; and the SFN, received by the receiving unit 702, at the video stream sending moment is determined, added to the video stream playback position synchronization parameter, and then sent by the RAN node.

The acquiring unit 703 is configured to: after the receiving unit receives the video stream playback position synchronization parameter, acquire an SFN at a video stream receiving moment.

The processing unit 704 is configured to adjust, according to the SFN, received by the receiving unit 702, at the video stream sending moment and the SFN, acquired by the acquiring unit 703, at the video stream receiving moment, the playback position parameter at the video stream sending moment, so as to coincide with a current playback position parameter of the network side device.

Figure 8:
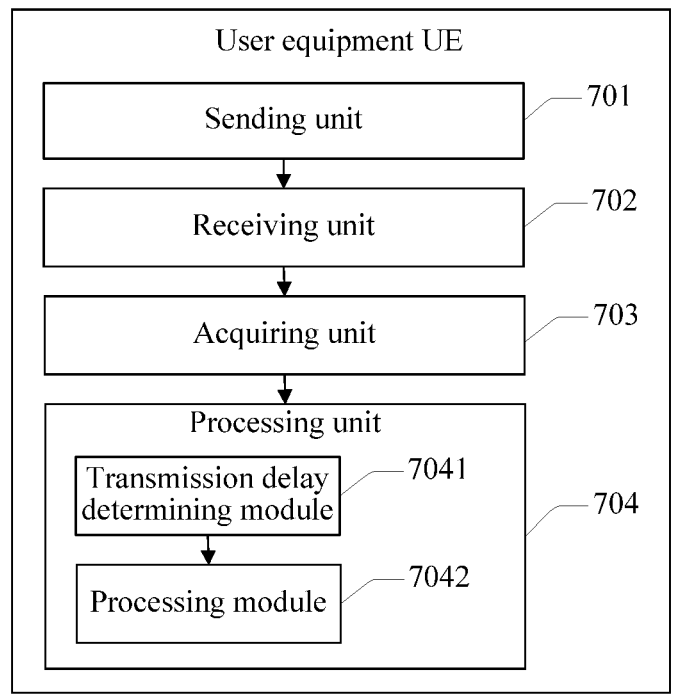
FIG. 8 is a block diagram of another apparatus (UE) for synchronizing video live broadcast according to another embodiment of the present invention.

Further optionally, as shown in FIG. 8, the processing unit 704 includes: a transmission delay determining module 7041, and a processing module 7042.

The transmission delay determining module 7041 is configured to determine a transmission delay of the video stream according to the SFN, received by the receiving unit 702, at the video stream sending moment and the SFN, acquired by the acquiring unit 703, at the video stream receiving moment.

Further optionally, the transmission delay determining module 7041 is configured to: determine the transmission delay of the video stream according to the relation $TD=(SFN2-SFN1)*10$, where TD represents the transmission delay of the video stream, SFN1 represents the SFN at the video stream sending moment, and SFN2 represents the SFN at the video stream receiving moment.

The processing module 7042 is configured to adjust, according to the transmission delay, determined by the transmission delay determining module 7041, of the video stream, the playback position parameter at the video stream sending moment, so as to coincide with the current playback position parameter on the network side device.

Further optionally, the processing module 7042 is configured to: determine a current playback position parameter according to the relation VT2=VT1+TD, where VT2 represents the current playback position parameter, and VT1 represents the playback position parameter at the video stream sending moment. It should be noted that an initial buffer delay of a video in this embodiment is implemented based on UE, and if playback on the UE has been synchronized with playback on the network, the initial buffer delay does not affect synchronized playback on the UE.

It should be noted that, in the apparatus shown in FIG. 7 and FIG. 8, because content such as specific implementation processes of the modules and information exchange among the modules is based on a same inventive idea of the method embodiments of the present invention, reference may be made to the method embodiments, and no further details are provided herein again.

This embodiment of the present invention provides an apparatus for synchronizing video live broadcast, where a receiving unit receives a video stream playback position synchronization parameter sent by a network side, where the video stream playback position synchronization parameter includes a playback position parameter at a video stream sending moment and a system frame number SFN at the video stream sending moment; and a processing unit adjusts, according to the SFN at the video stream sending moment, the playback position parameter at the video stream sending moment, so as to coincide with a current playback position parameter on the network side, so that the solutions provided in this embodiment of the present invention can achieve synchronization of different UEs when users watch a same live broadcast video, thereby improving user experience.

Figure 9:
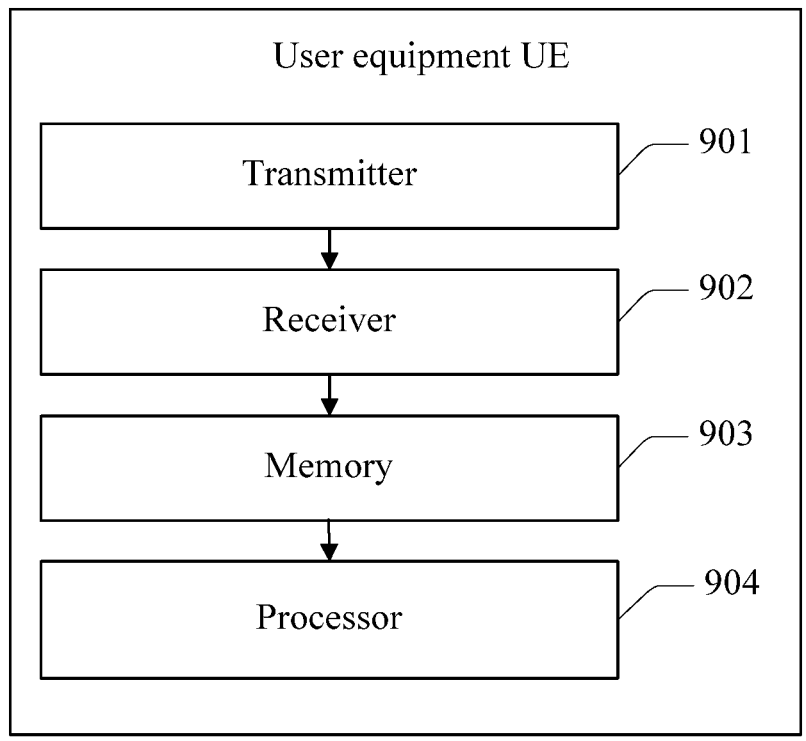
FIG. 9 is a block diagram of another apparatus (UE) for synchronizing video live broadcast according to another embodiment of the present invention.

An embodiment of the present invention provides an apparatus for synchronizing video live broadcast. The apparatus may be UE. As shown in FIG. 9, the apparatus includes: a transmitter 901, a receiver 902, a memory 903, and a processor 904.

The transmitter 901 is configured to send a video stream synchronization request to a network side device.

Optionally, the network side device may be an RAN Cache, or an RAN node and a Main Cache, or an RAN node and a live streaming server.

When the network side device is the RAN Cache, it should be noted that a Cache functional unit is placed on an RAN node, and therefore the UE can acquire a video stream from the RAN Cache or request video stream synchronization.

When the network side device is the RAN node and the Main Cache, or the RAN node and the live streaming server, it should be noted that, a Cache functional unit is placed in a core network, and may be disposed together with a gateway, for example, placed on a functional unit such as a general packet radio service gateway support node GGSN, a servicing GPRS support node SGSN, a packet data network gateway P-GW, or a serving gateway S-GW, or may also be an independent functional unit, collectively referred to as the Main Cache. In this case, the Cache functional unit may be or may not be disposed on the RAN node. The RAN node may be a network element such as an evolved base station eNode B, a base station Node B, or a radio network controller RNC.

Optionally, the transmitter 901 is configured to send the video stream synchronization request to the RAN Cache, or send the video stream synchronization request to the Main Cache or the live streaming server.

The receiver 902 is configured to, after the transmitter 901 sends the video stream synchronization request, receive a video stream playback position synchronization parameter sent by the network side device, where the video stream playback position synchronization parameter includes a playback position parameter at a video stream sending moment and a system frame number SFN at the video stream sending moment.

Optionally, the playback position parameter is determined according to a timer that is disposed in the RAN Cache or the Main Cache.

Optionally, the playback position parameter, received by the receiver 902, at the video stream sending moment and the SFN, received by the receiver 902, at the video stream sending moment are determined and sent by the RAN Cache; or, the playback position parameter, received by the receiver 902, at the video stream sending moment is determined and sent by the Main Cache or the live streaming server, and the SFN, received by the receiver 902, at the video stream sending moment is determined, added to the video stream playback position synchronization parameter, and then sent by the RAN node.

The memory 903 is configured to store information that includes a program routine.

The processor 904 is configured to couple with the transmitter, receiver and memory, and control execution of the program routine, including: after the receiver receives the video stream playback position synchronization parameter, acquire an SFN at a video stream receiving moment; and adjust, according to the SFN, received by the receiver, at the video stream sending moment and the acquired SFN at the video stream receiving moment, the playback position parameter at the video stream sending moment, so as to coincide with a current playback position parameter of the network side device.

Further optionally, the processor 904 is configured to determine a transmission delay of the video stream according to the SFN, received by the receiver 902, at the video stream sending moment and the SFN, acquired by the processor 904, at the video stream receiving moment.

Optionally, the transmission delay of the video stream is determined according to the relation TD=(SFN2−SFN1)*10, where TD represents the transmission delay of the video stream, SFN1 represents the SFN at the video stream sending moment, and SFN2 represents the SFN at the video stream receiving moment.

After the transmission delay of the video stream is determined, the playback position parameter at the video stream sending moment is adjusted according to the determined transmission delay of the video stream, so as to coincide with the current playback position parameter of the network side device.

Optionally, a current playback position parameter is determined according to the relation VT2=VT1+TD, where VT2 represents the current playback position parameter, and VT1 represents the playback position parameter at the video stream sending moment.

It should be noted that, in the apparatus shown in FIG. 9, because content such as specific implementation processes of the modules and information exchange among the modules is based on a same inventive idea of the method embodiments of the present invention, reference may be made to the method embodiments, and no further details are provided herein again.

This embodiment of the present invention provides an apparatus for synchronizing video live broadcast, where a receiver receives a video stream playback position synchronization parameter sent by a network side, where the video stream playback position synchronization parameter includes a playback position parameter at a video stream sending moment and a system frame number SFN at the video stream sending moment; and a processor adjusts, according to the SFN at the video stream sending moment, the playback position parameter at the video stream sending moment, so as to coincide with a current playback position parameter on the network side, which solves a problem that multiple users of a video live broadcast service of a wireless network cannot simultaneously watch a video, thereby improving user experience of the video live broadcast service.

Figure 10:
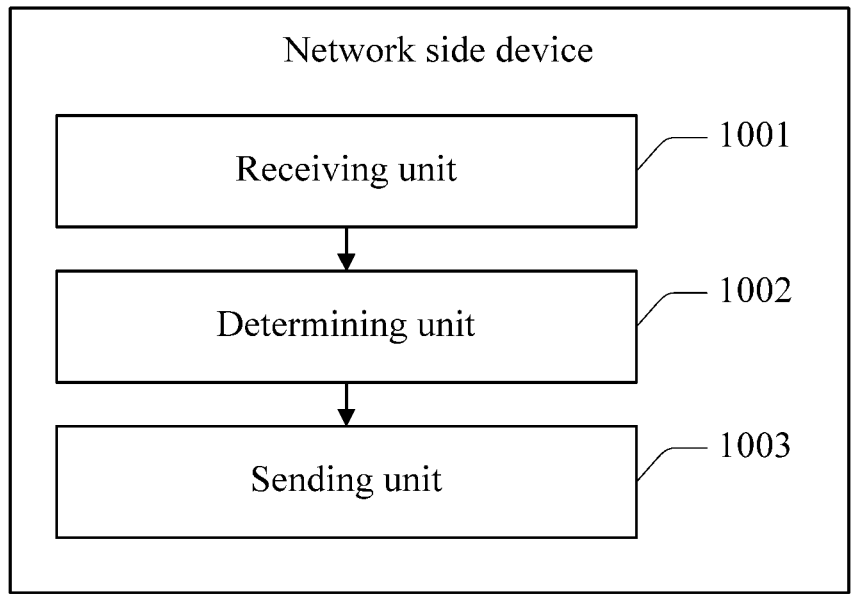
FIG. 10 is a block diagram of an apparatus (a network side device) for synchronizing video live broadcast according to another embodiment of the present invention.

An embodiment of the present invention provides an apparatus for synchronizing video live broadcast. The apparatus may be a network side device. As shown in FIG. 10, the apparatus includes: a receiving unit 1001, a determining unit 1002, and a sending unit 1003.

The receiving unit 1001 is configured to receive a video stream synchronization request sent by UE.

The determining unit 1002 is configured to: after the receiving unit 1001 receives the video stream synchronization request, determine a video stream playback position synchronization parameter according to the video stream synchronization request, where the video stream playback position synchronization parameter includes a playback position parameter at a video stream sending moment and a system frame number SFN at the video stream sending moment.

The sending unit 1003 is configured to: after the determining unit 1002 determines the video stream playback position synchronization parameter, send the video stream playback position synchronization parameter to the UE, so that the UE adjusts, according to the SFN at the video stream sending moment, the playback position parameter at the video stream sending moment to coincide with a current playback position parameter of the apparatus for synchronizing video live broadcast.

The apparatus for synchronizing video live broadcast may be a radio access network cache RAN Cache, or is an RAN node and a main cache Main Cache, or is an RAN node and a live streaming server.

When the apparatus for synchronizing video live broadcast is the RAN Cache, the determining unit in the RAN Cache determines the video stream playback position synchronization parameter; and the sending unit in the RAN Cache sends the video stream playback position synchronization parameter to the UE. It may be understood that the determining unit 1002 is the determining unit in the RAN Cache, and the sending unit 1003 is the sending unit in the RAN Cache.

Figure 11:
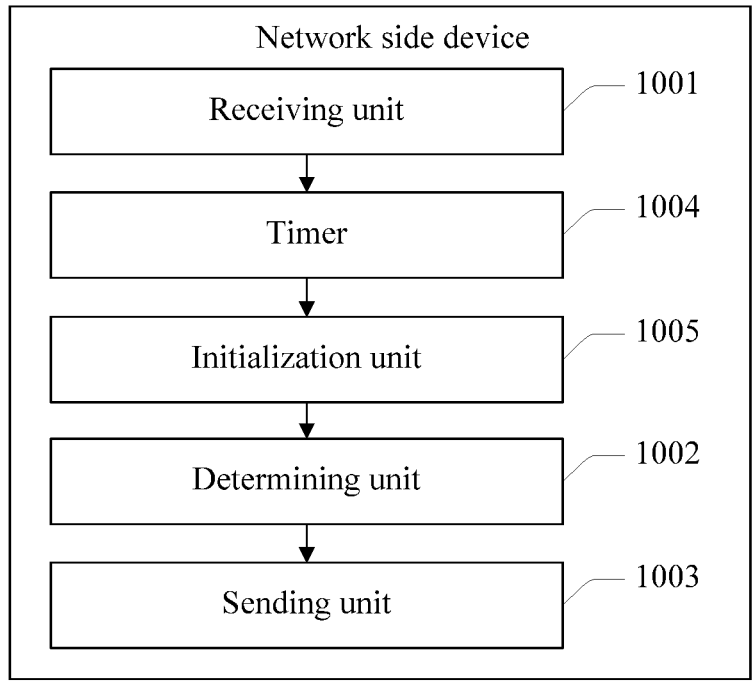
FIG. 11 is a block diagram of another apparatus (a network side device) for synchronizing video live broadcast according to another embodiment of the present invention.

Further optionally, as shown in FIG. 11, the apparatus further includes: a timer 1004 and an initialization unit 1005.

When the apparatus for synchronizing video live broadcast is the RAN Cache, the RAN Cache further includes the timer 1004, configured to determine the playback position parameter; and the initialization unit 1005, configured to: when the video stream synchronization request sent by first UE is received, initialize and start the timer.

Optionally, the initialization unit 1005 is configured to: set a value of the timer to be a video stream playback time point that is set when the first UE is synchronized.

Optionally, when the apparatus for synchronizing video live broadcast is the RAN node and the Main Cache, or is the RAN node and the live streaming server, the determining unit in the Main Cache or the live streaming server determines the playback position parameter at the video stream sending moment in the video stream playback position synchronization parameter; it may be understood that the determining unit 1002 is the determining unit in the Main Cache or the live streaming server; the sending unit in the Main Cache or the live streaming server sends the video stream playback position synchronization parameter to the RAN node; it may be understood that the sending unit 1003 is the sending unit in the Main Cache or the live streaming server; the determining unit in the RAN node determines the SFN at the video stream sending moment, and inserts the SFN at the video stream sending moment into the video stream playback position synchronization parameter; it may be understood that the determining unit 1002 is the determining unit in the RAN node; and the sending unit in the RAN node sends the video stream playback position synchronization parameter to the UE; it may be understood that the sending unit 1003 is the sending unit in the RAN node.

Further optionally, when the apparatus for synchronizing video live broadcast is the RAN node and the Main Cache, or is the RAN node and the live streaming server, the Main Cache or the live streaming server further includes: a timer, configured to determine the playback position parameter; and an initialization unit, configured to: when the video stream synchronization request sent by first UE is received, initialize and start the timer.

It may be understood that the timer 1004 is the timer in the Main Cache or the live streaming server, and the initialization unit 1005 is the initialization unit in the Main Cache or the live streaming server.

The initialization unit 1005 is specifically configured to: set a value of the timer to be a video stream playback time point that is set when the first UE is synchronized.

It should be noted that, in the apparatus shown in FIG. 10 and FIG. 11, because content such as specific implementation processes of the modules and information exchange among the modules is based on a same inventive idea of the method embodiments of the present invention, reference may be made to the method embodiments, and no further details are provided herein again.

This embodiment of the present invention provides an apparatus for synchronizing video live broadcast, where a determining unit determines a video stream playback position synchronization parameter according to a video stream synchronization request, where the video stream playback position synchronization parameter includes a playback position parameter at a video stream sending moment and a system frame number SFN at the video stream sending moment; so that UE can adjust, according to the SFN at the video stream sending moment in the video stream playback position synchronization parameter, the playback position parameter at the video stream sending moment, so as to coincide with a current playback position parameter on the network side, which solves a problem that multiple users of a video live broadcast service of a wireless network cannot simultaneously watch a video, thereby improving user experience of the video live broadcast service.

Figure 12:
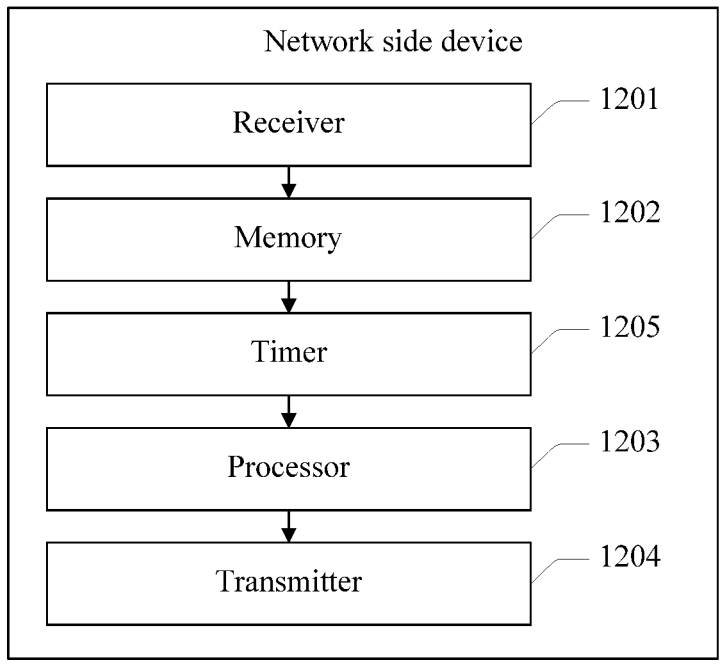
FIG. 12 is a block diagram of another apparatus (a network side device) for synchronizing video live broadcast according to another embodiment of the present invention.

An embodiment of the present invention provides an apparatus for synchronizing video live broadcast. The apparatus may be a network side device. As shown in FIG. 12, the apparatus includes: a receiver 1201, a memory 1202, a processor 1203, a transmitter 1204, and a timer 1205.

The receiver 1201 is configured to receive a video stream synchronization request sent by user equipment UE.

The memory 1202 is configured to store information that includes a program routine.

The processor 1203 is coupled with the receiver, the memory, and the transmitter, and is configured to control execution of the program routine, including after the receiver 1201 receives the video stream synchronization request, determining a video stream playback position synchronization parameter according to the video stream synchronization request, where the video stream playback position synchronization parameter includes a playback position parameter at a video stream sending moment and a system frame number SFN at the video stream sending moment.

The transmitter 1204 is configured to: after the processor 1203 determines the video stream playback position synchronization parameter, send the video stream playback position synchronization parameter to the UE, so that the UE adjusts, according to the SFN at the video stream sending moment, the playback position parameter at the video stream sending moment to coincide with a current playback position parameter of the apparatus for synchronizing video live broadcast.

Optionally, the apparatus for synchronizing video live broadcast is a radio access network cache RAN Cache, or is an RAN node and a main cache Main Cache, or is an RAN node and a live streaming server.

When the apparatus for synchronizing video live broadcast is the RAN Cache, the processor in the RAN Cache determines the video stream playback position synchronization parameter; and the transmitter in the RAN Cache sends the video stream playback position synchronization parameter to the UE.

It may be understood that the processor 1203 is the processor in the RAN Cache, and the transmitter 1204 is the transmitter in the RAN Cache.

Further optionally, the apparatus further includes a timer 1205.

When the apparatus for synchronizing video live broadcast is the RAN Cache, the RAN Cache further includes: the timer 1205, configured to determine the playback position parameter; it may be understood that the timer 1205 in the RAN Cache is the timer in the apparatus.

The processor 1203 is further configured to: when the video stream synchronization request sent by first UE is received, initialize and start the timer 1205.

Optionally, when the apparatus for synchronizing video live broadcast is the RAN node and the Main Cache, or is the RAN node and the live streaming server, the processor in the Main Cache or the live streaming server determines the playback position parameter at the video stream sending moment in the video stream playback position synchronization parameter; it may be understood that the processor 1203 is the processor in the Main Cache or the live streaming server; the transmitter in the Main Cache or the live streaming server sends the video stream playback position synchronization parameter to the RAN node; it may be understood that the transmitter 1204 is the transmitter in the Main Cache or the live streaming server; the processor in the RAN node determines the SFN at the video stream sending moment, and inserts the SFN at the video stream sending moment into the video stream playback position synchronization parameter; it may be understood that the processor 1203 is the processor in the RAN node; and the transmitter in the RAN node sends the video stream playback position synchronization parameter to the UE; it may be understood that the transmitter 1204 is the transmitter in the RAN node.

Further optionally, when the apparatus for synchronizing video live broadcast is the RAN node and the Main Cache, or is the RAN node and the live streaming server, the Main Cache or the live streaming server further includes: a timer, configured to determine the playback position parameter; and the processor is further configured to: when the video stream synchronization request sent by first UE is received, initialize and start the timer.

The timer 1205 may be the timer in the Main Cache or the live streaming server; and the processor 1203 may be the processor in the Main Cache or the live streaming server.

When the video stream synchronization request sent by first UE is received, the processor, initializing the timer, is specifically configured to: set a value of the timer to be a video stream playback time point that is set when the first UE is synchronized.

It should be noted that, in the apparatus shown in FIG. 12, because content such as specific implementation processes of the modules and information exchange among the modules is based on a same inventive idea of the method embodiments of the present invention, reference may be made to the method embodiments, and no further details are provided herein again.

This embodiment of the present invention provides an apparatus for synchronizing video live broadcast, where a processor determines a video stream playback position synchronization parameter, where the video stream playback position synchronization parameter includes a playback position parameter at a video stream sending moment and a system frame number SFN at the video stream sending moment, and a transmitter is used to send the video stream playback position synchronization parameter to UE, so that the UE can adjust, according to the SFN at the video stream sending moment in the video stream playback position synchronization parameter, the playback position parameter at the video stream sending moment, so as to coincide with a current playback position parameter on the network side, which solves a problem that multiple users of a video live broadcast service of a wireless network cannot simultaneously watch a video, thereby improving user experience of the video live broadcast service.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

Based on the description of the foregoing implementation manners, a person skilled in the art may clearly understand that the present invention may be implemented by software in addition to necessary universal hardware, or by dedicated hardware, including a dedicated integrated circuit, a dedicated CPU, a dedicated memory, a dedicated component, and the like. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present invention.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly; for related parts, refer to partial descriptions in the method embodiment.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
sending, by a user equipment, a video stream synchronization request to a first network side device, wherein the video stream synchronization request requests to acquire a live video of the first network side device, the acquired live video to be played synchronously by the user equipment with the live video of the first network side device, wherein the first network side device receives the video stream synchronization request after it is forwarded to the first network side device from a base station that connects the user equipment to a network;
receiving, by the user equipment, a video stream playback position synchronization parameter sent by the first network side device, wherein the video stream playback position synchronization parameter comprises a playback position parameter at a video stream sending moment and a system frame number (SFN) at the video stream sending moment, and wherein the SFN at the video stream sending moment is added to the video stream playback position synchronization parameter by the base station that connects the user equipment to the network, or the SFN is added to the video stream playback position synchronization parameter by a second network side device that receives the playback position parameter from the first network side device;
acquiring, by the user equipment, a SFN at a video stream receiving moment; and
adjusting, by the user equipment according to the SFN at the video stream sending moment and the SFN at the video stream receiving moment, the playback position parameter at the video stream sending moment.

2. The method according to claim 1, wherein adjusting the playback position parameter at the video stream sending moment comprises:
determining a transmission delay of the video stream according to the SFN at the video stream sending moment and the SFN at the video stream receiving moment; and
adjusting, according to the transmission delay of the video stream, the playback position parameter at the video stream sending moment.

3. The method according to claim 2, wherein determining the transmission delay of the video stream comprises:
determining the transmission delay of the video stream according to the relation TD=(SFN2−SFN1)*10, wherein TD represents the transmission delay of the video stream, SFN1 represents the SFN at the video stream sending moment, and SFN2 represents the SFN at the video stream receiving moment.

4. The method according to claim 1, wherein the first network side device comprises a Main Cache or a live streaming server, and the received playback position parameter at the video stream sending moment is determined and sent by the Main Cache or the live streaming server, and the received SFN at the video stream sending moment is determined, added to the video stream playback position synchronization parameter, and then sent by the base station.

5. A non-transitory computer-readable storage medium comprising instructions which, when executed by a computer, cause the computer to carry out the method of claim 1.

6. The method according to claim 2, wherein determining the transmission delay of the video stream comprises:
determining the transmission delay of the video stream according to the relation TD=(SFN2−SFN1)*frame_duration, wherein TD represents the transmission delay of the video stream, SFN1 represents the SFN at the video stream sending moment, SFN2 represents the SFN at the video stream receiving moment, and frame_duration represents a duration of each system frame.

7. A method, comprising:
receiving, by a network side device, a video stream synchronization request sent by user equipment (UE), wherein the video stream synchronization request requests to acquire a live video of the network side device, the acquired live video to be played synchronously with the live video of the network side device, and wherein the network side device comprises a radio access network (RAN) node that corresponds to a base station that connects the user equipment to a network;
determining, by the network side device, a video stream playback position synchronization parameter according to the video stream synchronization request, wherein the video stream playback position synchronization parameter comprises a playback position parameter at a video stream sending moment and a system frame number (SFN) at the video stream sending moment, and wherein the SFN at the video stream sending moment is added to the video stream playback position synchronization parameter by the RAN node that corresponds to the base station that connects the user equipment to the network; and
sending, by the network side device, the video stream playback position synchronization parameter to the UE, so that the UE adjusts, according to the SFN at the video stream sending moment, the playback position parameter at the video stream sending moment to coincide with a current playback position parameter of the network side device.

8. The method according to claim 7, wherein the network side device comprises the RAN node and a Main Cache, or the RAN node and a live streaming server, or wherein the RAN node comprises a RAN cache.

9. The method according to claim 7, wherein the network side device comprises the RAN node and a Main Cache, or the RAN node and a live streaming server, and the Main Cache or the live streaming server determines the playback position parameter at the video stream sending moment in the video stream playback position synchronization parameter;
wherein the Main Cache or the live streaming server sends the video stream playback position synchronization parameter to the RAN node;
wherein the RAN node determines the SFN at the video stream sending moment, and inserts the SFN at the video stream sending moment into the video stream playback position synchronization parameter; and
wherein the RAN node sends the video stream playback position synchronization parameter to the UE.

10. The method according to claim 8, wherein a timer is disposed in the Main Cache, the playback position parameter is determined according to the timer, and the network side device initializes and starts the timer in response to receiving the video stream synchronization request sent by the UE.

11. A non-transitory computer-readable storage medium comprising instructions which, when executed by a computer, cause the computer to carry out the method of claim 7.

12. An apparatus, comprising:
a transmitter, configured to send a video stream synchronization request to a first network side device, wherein the video stream synchronization request requests to acquire a live video of the first network side device, the acquired live video to be played synchronously by the apparatus with the live video of the first network side device, wherein the first network side device receives the video stream synchronization request after it is forwarded to the first network side device from a base station that connects the apparatus to a network;
a receiver, configured to receive a video stream playback position synchronization parameter sent by the first network side device, wherein the video stream playback position synchronization parameter comprises a playback position parameter at a video stream sending moment and a system frame number (SFN) at the video stream sending moment, and wherein the SFN at the video stream sending moment is added to the video stream playback position synchronization parameter by the base station that connects the apparatus to the network, or the SFN is added to the video stream playback position synchronization parameter by a second network side device that receives the playback position parameter from the first network side device; and
a processor, configured to acquire an SFN at a video stream receiving moment, and adjust, according to the SFN at the video stream sending moment and the SFN at the video stream receiving moment, the playback position parameter at the video stream sending moment.

13. The apparatus according to claim 12, wherein the processor is further configured to:
determine a transmission delay of the video stream according to the SFN at the video stream sending moment and the SFN at the video stream receiving moment; and adjust, according to the transmission delay of the video stream, the playback position parameter at the video stream sending moment.

14. The apparatus according to claim 13, wherein the processor is further configured to:
determine the transmission delay of the video stream according to the relation TD=(SFN2−SFN1)*10, wherein TD represents the transmission delay of the video stream, SFN1 represents the SFN at the video stream sending moment, and SFN2 represents the SFN at the video stream receiving moment.

15. The apparatus according to claim 12, wherein the first network side device comprises a Main Cache or a live streaming server, and the playback position parameter at the video stream sending moment is determined and sent by the Main Cache or the live streaming server, and the SFN at the video stream sending moment is determined, added to the video stream playback position synchronization parameter, and then sent by the base station.

16. An apparatus, comprising:
at least one receiver, configured to receive a video stream synchronization request sent by user equipment (UE), wherein the video stream synchronization request requests to acquire a live video of the apparatus, the acquired live video to be played synchronously with the live video of the apparatus, and wherein the apparatus comprises a radio access network (RAN) node that corresponds to a base station that connects the apparatus to a network;
at least one processor, configured to determine a video stream playback position synchronization parameter according to the video stream synchronization request, wherein the video stream playback position synchronization parameter comprises a playback position parameter at a video stream sending moment and a system frame number (SFN) at the video stream sending moment, and wherein the SFN at the video stream sending moment is added to the video stream playback position synchronization parameter by the RAN node that corresponds to the base station that connects the user equipment to the network; and
at least one transmitter, configured to send the video stream playback position synchronization parameter to the UE, so that the UE adjusts, according to the SFN at the video stream sending moment, the playback position parameter at the video stream sending moment to coincide with a current playback position parameter of the apparatus for synchronizing video live broadcast.

17. The apparatus according to claim 16, wherein the RAN node comprises a radio access network (RAN) Cache, or the apparatus further comprises a Main Cache.

18. The apparatus according to claim 16, wherein the RAN node comprises a RAN Cache, and the RAN Cache further comprises a timer, configured to determine the playback position parameter; and
wherein the at least one processor is further configured to initialize and start the timer in response to receiving the video stream synchronization request sent by the UE.

19. An apparatus, comprising a RAN node and a Main Cache, or a RAN node and a live streaming server, the apparatus further comprising:
a receiver, configured to receive a video stream synchronization request sent by user equipment (UE), wherein the video stream synchronization request requests to acquire a live video of the apparatus, to be played synchronously with the live video of the apparatus;

a first processor, in the Main Cache or the live streaming server, configured to determine a playback position parameter at a video stream sending moment;

a first transmitter, in the Main Cache or the live streaming server, configured to send the playback position parameter at the video stream sending moment to the RAN node;

a second processor, in the RAN node, configured to determine an SFN at the video stream sending moment, and to determine a video stream playback position synchronization parameter comprising the SFN at the video stream sending moment and the playback position parameter at the video stream sending moment, wherein the RAN node corresponds to a base station that connects the user equipment to a network; and a second transmitter, in the RAN node, configured to send the video stream playback position synchronization parameter to the UE, so that the UE adjusts the playback position parameter at the video stream sending moment for synchronized playback of the live video stream.

* * * * *